March 25, 1924.

T. A. WILLARD

GRID PASTING MACHINE

Filed Oct. 19, 1918

1,487,774

5 Sheets-Sheet 1

Inventor:
Theodore A. Willard
By
Thurston + Kwis
attys.

March 25, 1924.

T. A. WILLARD

GRID PASTING MACHINE

Filed Oct. 19, 1918     5 Sheets-Sheet 2

1,487,774

Inventor:
Theodore A. Willard,
By Thurston & Kwis
attys.

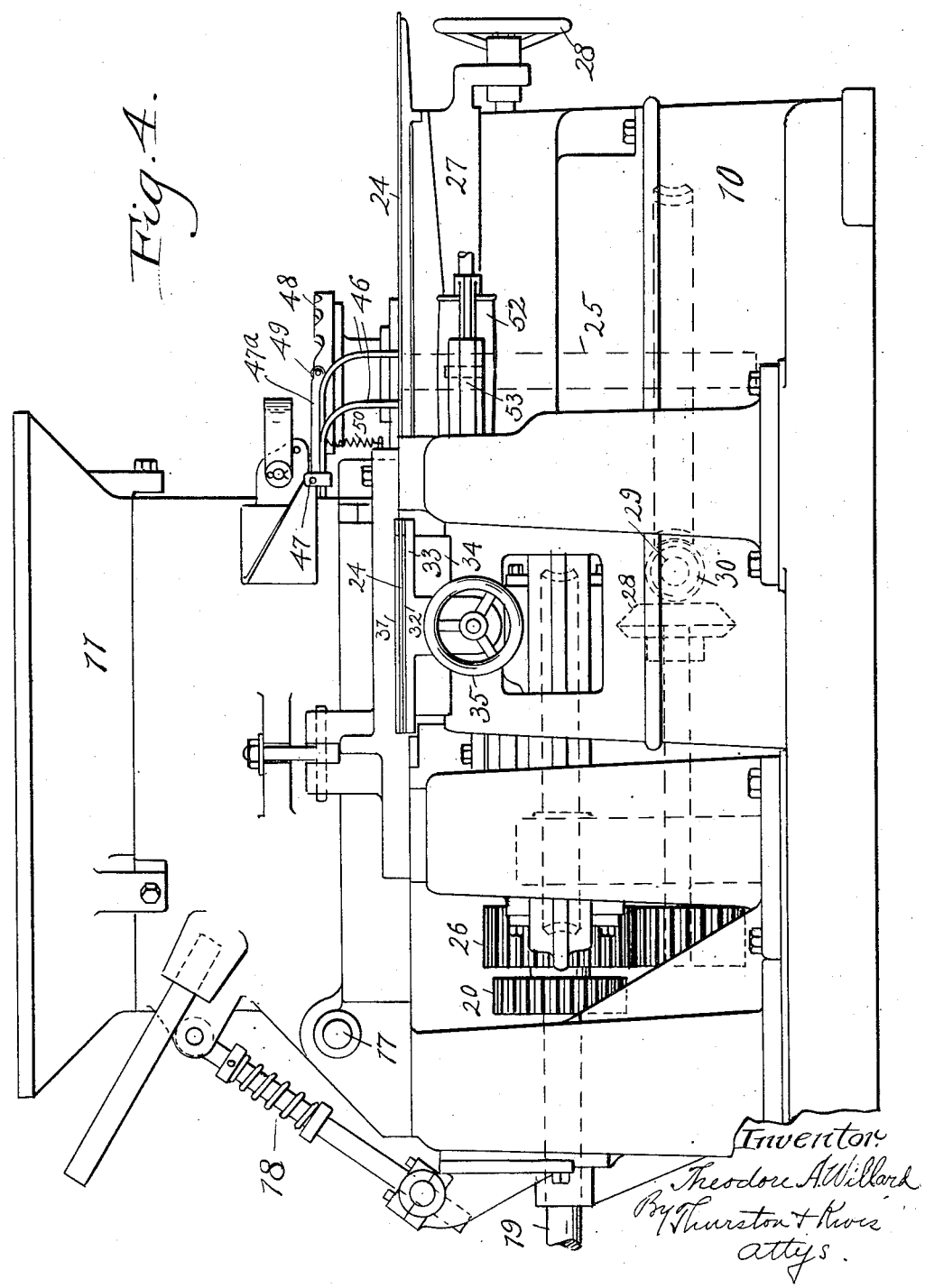

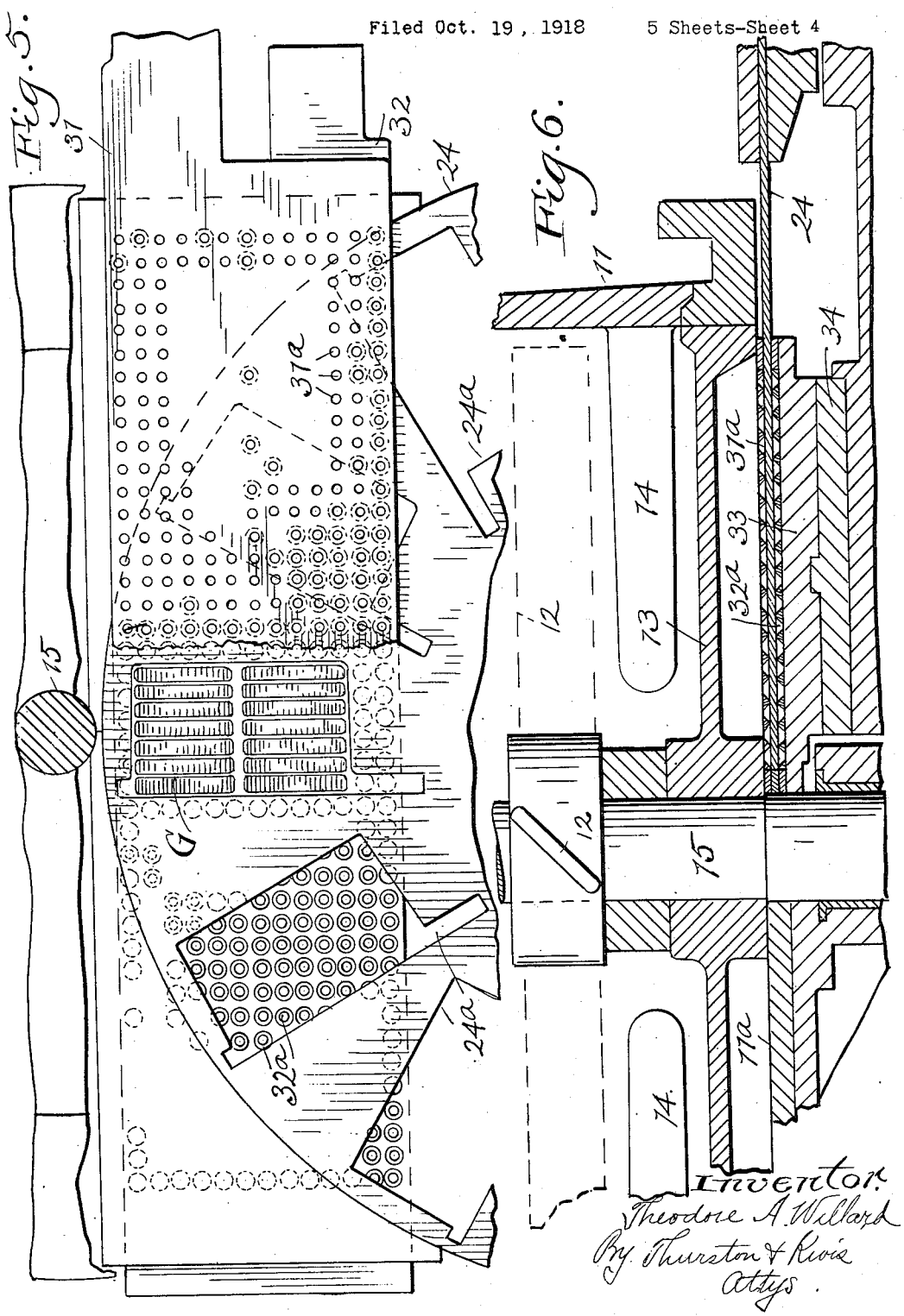

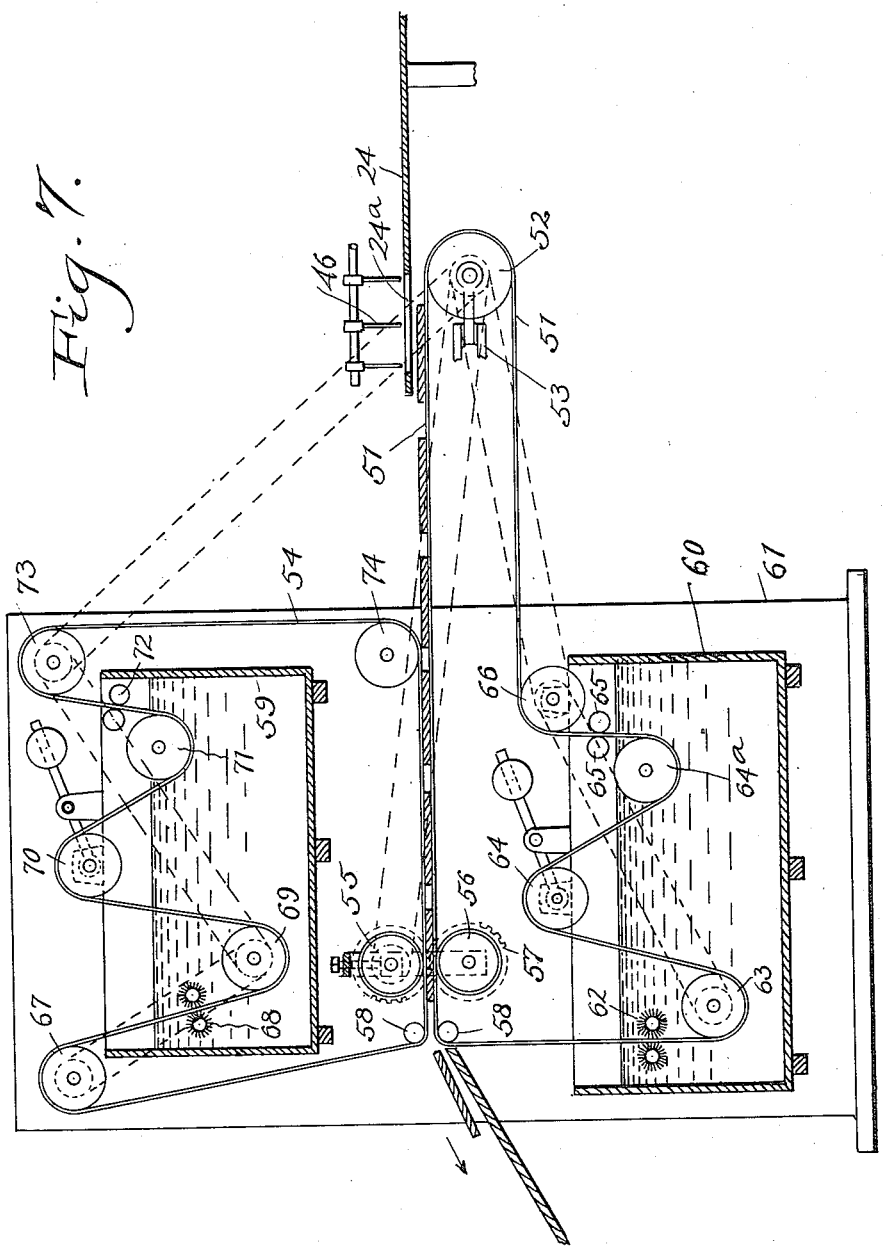

Patented Mar. 25, 1924.

1,487,774

UNITED STATES PATENT OFFICE.

THEODORE A. WILLARD, OF EAST CLEVELAND, OHIO, ASSIGNOR TO WILLARD STORAGE BATTERY COMPANY, OF CLEVELAND, OHIO, A CORPORATION OF WEST VIRGINIA.

GRID-PASTING MACHINE.

Application filed October 19, 1918. Serial No. 258,915.

*To all whom it may concern:*

Be it known that I, THEODORE A. WILLARD, a citizen of the United States, residing at East Cleveland, in the county of Cuyahoga and State of Ohio, have invented a certain new and useful Improvement in Grid-Pasting Machines, of which the following is a full, clear, and exact description.

This invention relates to a machine or apparatus for pasting storage battery grids, and has for its chief object to provide a machine to which the storage battery grids may be fed, and which fills all open spaces or interstices of the grids with the paste or active material, and which compresses the paste in the grids, smoothes the surface thereof, and finally discharges the grids with the spaces not only filled with the paste, but uniformly and homogeneously filled and compacted from one smoothed surface to the other so that the grids as they leave the machine are in proper condition for efficient use in a battery.

In the machine which constitutes the subject matter of the present invention, a carrier, preferably in the form of a rotating disk is provided, and this carrier conveys the grids between a pair of reciprocating blades or slides located beneath the discharge opening of the hopper and serving to feed and to compact the paste into the grids as they are gradually carried along. Additionally the grids receive a final compressing and smoothing action after they pass from between the reciprocating blades and are discharged from the carrier or disk referred to, and this is preferably accomplished by causing the filled grids to pass between a pair of compressing and smoothing rollers properly positioned with respect to a suitable conveying means such as belts.

The invention resides in numerous features of construction and arrangement of parts, and in certain novel combinations of elements included in the apparatus briefly referred to above, and by which the filling, compacting and smoothing is obtained with a high degree of efficiency.

Figure 1:
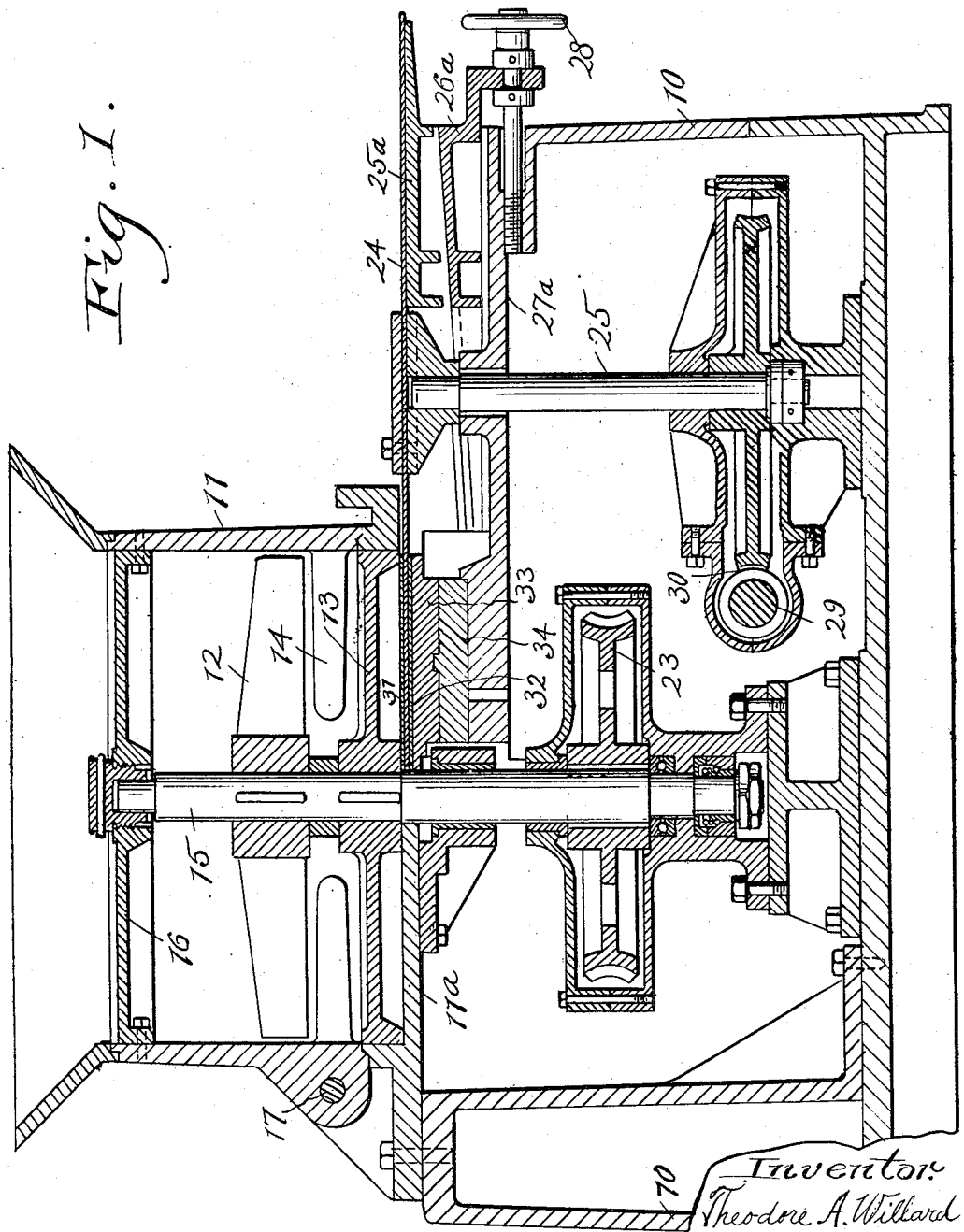
Figure 2:
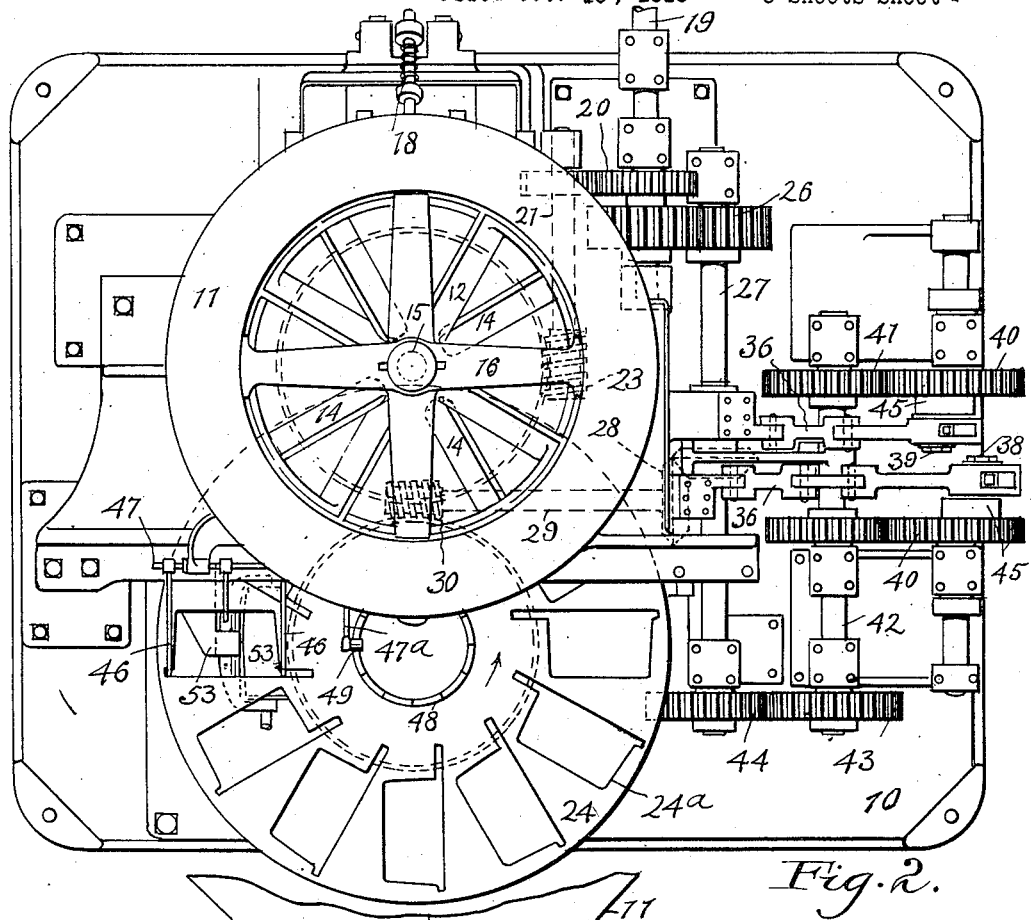
Figure 3:
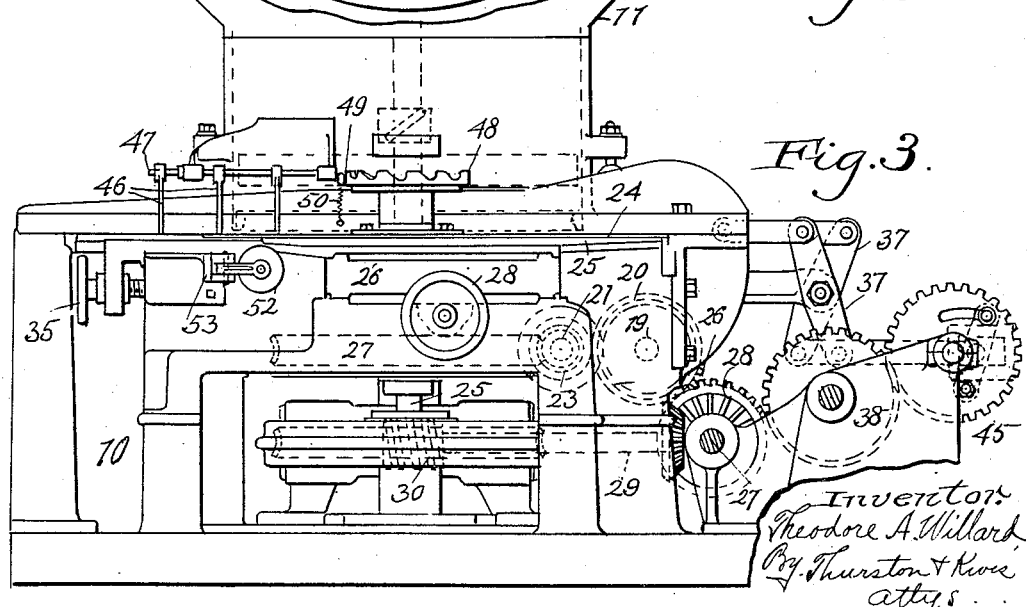

The invention in its preferred form is illustrated in the accompanying sheets of drawings wherein Fig. 1 is a vertical sectional view through that part of the machine wherein the grids are filled with paste, and wherein the paste is compacted and smoothed to a degree; Fig. 2 is a top plan view of the same; Fig. 3 is a side elevation looking toward the inner side of Fig. 2; Fig. 4 is a side elevation looking toward the right of Fig. 2; Fig. 5 is an enlarged fragmentary view, showing a portion of the rotary grid conveying disk and the reciprocating blades or slides which fill the grids with the paste fed from the hopper, a portion of which also is shown; Fig. 6 is a vertical sectional view on an enlarged scale, taken through a portion of the hopper, the reciprocating blades and through a portion of the grid carrying disk; and Fig. 7 is a view partly in side elevation and partly in section of the apparatus which is used in conjunction with the machine shown in the preceding figures, and receives the filled grids and gives the paste its final compacting and smoothing.

The principal part of the machine, i. e., that part wherein the grids are filled with paste, as illustrated in Figs. 1 to 6 inclusive, includes a heavy cast metal base 10 substantially rectangular in outline.

At the upper rear part of the base is a hopper 11 into which the paste is deposited, the axis of the hopper being vertical, and the top being open and flaring, as shown particularly in Fig. 1. The bottom wall 11ª (see Fig. 1) of the hopper closes only about one-half of the bottom, the forward half being open for the downward feeding of paste into the grids. In a strict sense the forward part of the bottom is not open, inasmuch as it receives perforated reciprocating blades and a section of the rotary grid carrier, the paste feeding from the hopper through the upper blade and into the grids as will be subsequently explained.

The paste is agitated and also fed downwardly in the hopper by a series of rotary and fixed inclined blades, including rotating upper inclined blades 12, rotating lower inclined blades 13, and intermediate stationary inclined blades 14. The blades 12 and 13 are secured to a vertical agitating and feeding shaft 15, the top of which is centered in a cross bar 16 extending across the upper part of the hopper, and the lower part being journaled in bearings supported by the frame of the machine. The action of these rotating and fixed blades is to agitate but constantly press the paste downward toward the outlet into the grids. The lower blades 13 are somewhat similar to the spokes of a wheel, as their inner ends are secured to a hub keyed to the shaft and their outer ends to a rim which has a working or running fit with the inner lower periphery of the hopper. The lower edges of the blades 13 wipe across the bottom of the hopper formed in part by the bottom wall 11ª, and the upper reciprocating blade.

The lower part of the hopper is pivoted on a transverse pin 17 so that it can be tipped or swung rearwardly when access is to be had to the working parts for cleaning purposes. A shock absorbing or checking device 18, illustrated in Fig. 4, serves to check the rearward swinging movement as the hopper is swung back. This is a detail, however, that is not, of course, essential to the operativeness of the main parts.

The main drive shaft 19, a portion of which is shown in Fig. 2 drives the feed shaft 15 through spur gears 20 and a worm shaft 21 (Fig. 2) connected by worm gearing 23 to the vertical shaft 15, the worm wheel which is attached to the shaft 15 being shown in Fig. 1.

Mounted to rotate about a vertical axis in front of the hopper is a rotary disk or grid carrier 24 which is rotated by a vertical shaft 25 (see Fig. 1) driven from the main drive shaft 19 through driving mechanism including spur gearing 26, shaft 27, bevel gearing indicated by dotted lines in Figs. 2 and 3, and transverse worm shaft 29 which is connected by a worm gearing 30 to the vertical shaft 25. The front and side portions of the disk or grid carrier 24, rest on a horizontal table 25ª, the height of which may be adjusted to adapt the table for different thicknesses of disks by an adjustable tapered slide or gib 26ª which is between the table 25ª and a lower supporting shelf 27ª forming a part of the frame work or base of the machine. This gib or slide 26ª may be adjusted by turning a front hand wheel 28 which is shown in Figs. 1, 3 and 4.

This disk 24 has a series of openings 24ª corresponding in size and shape to the grids which are to be pasted or filled with active material. For each size of grid a different disk 24 will be utilized, these disks 24 being readily removable to adapt the machine for different sizes of grids. As the disk 24 is rotated the grids will be placed in the openings 24ª, usually by the operator who stands at the front of the machine in front of the disk, and places the grids one at a time into the openings as they pass the filling station. However, they can be fed into the disk automatically if desired.

As the grids are placed in the openings of the disk, they are carried by the counter-clockwise movement of the disk beneath the lower front of the hopper and between a pair of perforated filling and compacting blades or slides 31 and 32, which are reciprocated rapidly, with the blade 31 above the disk and the grids to be filled, and the blade 32 beneath the disk and the grids.

As will be seen by reference to Figs. 5 and 6, wherein the pasting action of these blades is best illustrated, the two blades have a large number of closely associated openings 31ª and 32ª, which are tapered, those in the upper blade being smallest at the top, and those in the lower blade being largest at the top.

The action of these blades is to fill the grids and to compact the paste therein as the grids are moved along between the blades, the material feeding through the perforations of the other blade into the grids. The lower blade has its openings normally filled with the paste, and the sharp edges formed by these openings naturally assist the upper blade in securing a complete filling. It should be noted at this point that the paste is fed into the grids from one side only, though the reciprocating filling and compacting blades are operated on both sides of the grids. This feeding from one side by the action of the reciprocating blades on both sides has the effect of producing a homogeneous filling from one side of the grid to the other. That is to say, the density of the paste is uniform throughout the openings or interstices of each grid.

By reference to Figs. 1 and 6, it will be seen that the lower blade 32 reciprocates on a base or table 33 whose upper surface is horizontal and slightly below the level of the upper surface of table 25ª, which receives the rotating grid carrying disk 24. The lower surface of this table 33 for the slide or blade 32 and the upper surface of the support 34 for this table are inclined, and the height of the surface over which the lower blade 32 slides can be adjusted in conformity with the adjustment of the table 25 for the disk so as to adapt the blades for different thicknesses of disks and different sizes of grids, and this is done through the instrumentality of an adjusting screw having a hand wheel 35 connected to the table 33 as shown in Figs. 3 and 4.

These blades 31, 32, are rapidly and simultaneously reciprocated in opposite directions by mechanism including links 36, (see Figs. 2 and 3), connected to the upper ends of pivoted rockers 37 whose lower ends are connected by links or connecting rods 38, to crank pins 39 carried by a pair of rotating gear wheels 40. These gears engage gears 41 connected to a shaft 42 which in turn are connected by gears 43 and 44 to the shaft 27 previously referred to, and utilized in rotating the shaft carrying the rotating grid holding disk 24. The crank pins 39 are preferably carried by blocks 45 adjustably secured to the inner face of the gears 40 so that the throw of the crank pins and the endwise movement of the blades or slides can be varied or adjusted to produce the best results.

Thus it will be seen that when the machine so far described is in operation, the paste is gradually fed downward through the hopper by the rotating blades and the rotating disk 24 gradually carries the grids which are placed in the openings 24ª to the filling space beneath the reciprocating blades, the latter causing the paste to be forced into the grids until the interstices are filled with the compacted paste. The extent of movement of the grids while they are being filled is illustrated in Fig. 5 by reference to which it will be seen that the filling action begins at or about the time the grid reaches the position indicated by the right hand grid space 24ª, and continues until the grid is carried out from between the reciprocating blades near the position indicated by left hand grid space 24ª. When the grid shown at G, reaches the position at the middle of the figure, it is wholly between the two blades, and from this position it gradually passes from between the blades, as illustrated in Fig. 5.

After the grids pass between the reciprocating blades and are filled with paste, they are automatically removed from the disk 24 by the action of knock-out pins 46 shown in Figs. 2, 3, 4, and 7, and when they are removed from the openings 24ª they pass to another important part of the machine. These knock-out pins 46 are secured to a horizontal pin 47 which is rocked so that the pins will be repeatedly and alternately elevated and then suddenly lowered to knock the grids from the openings in the disk. This is preferably accomplished by a cam or notched ring 48 having at its upper edge a series of notches engaged by a roller 49 on a forwardly bent portion 47ª of the shaft to which the knock-out pins 46 are attached. The roller drops into one of these notches when the filled or pasted grid reaches knock-out position, and when this occurs a spring 50 shown in Fig. 3, snaps the knock-out pins downwardly and the ends of the pins engage the grid with sufficient force to knock it from the rotating disk 24.

In the embodiment of my invention here shown, the grids as they are knocked from the disk 24 drop onto a belt 51 (see Fig. 7) which belt passes about a pulley 52 which is beneath the knock-out position and is supported by a bracket 53 on that part of the machine already described, this roller being shown in Figs. 2, 3 and 4.

In addition to the belt 51 an upper belt 54 is utilized, and as the grids fall on the belt 51 and are carried to the left as viewed in Fig. 7 they pass beneath the lower leg of the upper belt and are held between the two belts, both of which travel at precisely the same speed. Finally the grids thus held between the two belts pass between two rollers 55 and 56, which further compress the paste in the grids and give the final smoothing effect, so that when the grids pass these rollers the paste is sufficiently compressed and the surfaces are sufficiently smooth to render the grids in very satisfactory condition for use without further treatment. One of these rollers 55 is above the lower leg of the upper belt 54 and the other is beneath the upper leg of the lower belt 51. These rollers which are preferably made of wood, and cloth covered, are driven at the same speed by gears 57 and they are the proper distance apart to have the correct action on the paste.

A short distance beyond the rollers 55, 56, the grids are discharged from between the belts, and it will be noted that at the discharge point the two belts make sharp turns about small rollers 58. The use of these small rollers and the consequent sharp turning of the belts at this point is important, inasmuch as it allows the grids to pass from between the belts without danger of the paste being pulled from the grids by the belts.

A certain amount of the paste gets onto the surfaces of the belts, making it necessary that the belts be constantly washed and scrubbed. I therefore provide two washing tanks 59, 60, one for the upper belt and the other for the lower belt, these tanks being supported between the side frames 61 of this part of the apparatus. It will be observed that the lower belt 51 passes downwardly into the water filled tank 60, past a pair of scrubbers 62 around an idler pulley 63, then upwardly about a belt tightening pulley 64, and again down into the tank, around a pulley 64ª, then between a pair of wringers 65, which will be preferably formed of rubber, then upward around a pulley 66, and then to the pulley 52. In thus passing through the water of the tank and past the scrubbers, the paste is thoroughly cleansed from this belt, and as the belt leaves the water, the excess water is squeezed from the belt by the wringer.

Similarly the upper belt after passing around the small roller or pulley 58 passes upwardly around a pulley 67 above the upper tank, then downwardly into the water of the tank past a pair of scrubbers 68 similar to the scrubbers 62 which scrubbers are preferably in the form of brushes with stiff bristles, then around an idler 69, around a belt tightening idler 70, then again down into the tank around an idler 71, then up between a pair of wringing rollers 72 and around another pulley 73 above the tank, and down and around a lower pulley 74.

The two belts 51 and 54 are, as before stated, driven at the same speed and the rollers 55 and 56 are driven preferably by chain and sprocket gearing which is indicated by dotted lines in Fig. 7. It may be desirable also that the scrubbers and wringers be positively actuated, but the actuating means is not shown for the sake of simplicity and to avoid confusion of the drawings.

The action of the machine as a whole is believed to be clear from the foregoing description, so that further description of the operation is thought to be unnecessary.

It should be noted, however, that the pasting action of the machine, aside from a possible manual filling of the grid carrying disk 24, is wholly automatic, it being unnecessary that the grids be handled manually from the time they are placed in the rotating disks of the machine in which they are filled with paste until they are discharged from between the belts of the final compressing and squeezing apparatus.

Having described my invention, I claim:

1. In a machine for pasting storage battery grids, a receptacle adapted to be filled with paste, means for receiving the grids and feeding them past the receptacle, and a reciprocating slide between the receptacle and the grids for forcibly feeding the paste into the interstices of the grids.

2. In a grid pasting machine, a receptacle adapted to receive paste and having a discharge opening, means for receiving the grids and conveying them to the discharge opening, and a perforated reciprocating slide adjacent the discharge opening for forcibly feeding the paste into the interstices of the grids.

3. In a grid pasting machine, a receptacle adapted to receive paste and having a discharge opening, a pair of reciprocating slides adjacent the discharge opening, and means for feeding the grids past the discharge opening between said slides.

4. In a grid pasting machine, a receptacle adapted to receive paste and having a discharge opening, a rotary grid conveying member for carrying the grids one at a time past said discharge opening and means for rubbing the paste into the grids.

5. In a grid pasting machine, a receptacle adapted to receive paste and having a discharge opening, a disk having openings for the grids and adapted to carry them past the discharge opening and means movable laterally over the grid to wipe the paste therein.

6. In a grid pasting machine, a receptacle adapted to receive paste and having a discharge opening, means at the discharge opening for rubbing the paste into the grids, and means comprising a rotary disk for conveying the grids past said rubbing means.

7. In a grid pasting machine, a receptacle adapted to receive paste and having a discharge opening, means at the discharge opening and reciprocating laterally thereof, for feeding the paste into the grids, and conveying means for carrying the grids past said feeding means.

8. In a grid pasting machine, a receptacle adapted to receive paste and having a discharge opening, a pair of reciprocating slides adjacent the discharge opening, and means for carrying the grids between said slides.

9. In a grid pasting machine, a receptacle adapted to receive paste and having a discharge opening, means for carrying the grids past the discharge opening, and means for forcing the paste into the grids comprising a laterally reciprocating member having beveled openings.

10. In a grid pasting machine, a receptacle adapted to receive paste and having a discharge opening, a pair of reciprocating slides adjacent the discharge opening and both having openings, and means for feeding the grids between said slides.

11. In a grid pasting machine, a receptacle adapted to receive paste and having a discharge opening, a pair of reciprocating slides adjacent said opening, each provided with beveled openings, and means for feeding the grids between said slides.

12. In a grid pasting machine, a receptacle adapted to receive paste and having a discharge opening, means for rubbing the paste into the grids, means for carrying said grids past the rubbing means, and means for automatically discharging the grids from the conveying means.

13. In a grid pasting machine, a receptacle adapted to receive paste and having a discharge opening, feeding means adjacent said opening and movably mounted to rub the paste into the grids, a grid conveyor in the form of a rotary disk having openings adapted to receive the grids and serving to convey the grids past the feeding means, and means located beyond the feeding means for removing the filled grids from the disk.

In testimony whereof, I hereunto affix my signature.

THEODORE A. WILLARD.